United States Patent [19]

Girelli

[11] Patent Number: 4,892,501
[45] Date of Patent: Jan. 9, 1990

[54] DOLL'S HEAD AND METHOD OF FABRICATION

[75] Inventor: Leonard Girelli, Stanley, Hong Kong
[73] Assignee: Mattel, Inc., Hawthorne, Calif.
[21] Appl. No.: 160,376
[22] Filed: Feb. 25, 1988

Related U.S. Application Data

[63] Continuation of Ser. No. 808,516, Dec. 13, 1985, abandoned.

[51] Int. Cl.⁴ ............................................. A63H 3/02
[52] U.S. Cl. .................................. 446/372; 446/385; 156/61; 156/196
[58] Field of Search ............. 446/372, 369, 391, 385; 156/61, 196, 219; 264/324, 321

[56] References Cited

U.S. PATENT DOCUMENTS

| | | | |
|---|---|---|---|
| 1,321,135 | 11/1919 | Smith | 446/385 |
| 1,485,640 | 3/1924 | Smith | 446/385 X |
| 1,523,150 | 1/1925 | Williams | 446/372 |
| 1,540,384 | 6/1925 | Bloom | 446/391 X |
| 2,127,487 | 8/1938 | Voit . | |
| 2,466,586 | 4/1949 | Evans | 156/221 |
| 2,727,278 | 12/1955 | Thompson . | |
| 2,809,910 | 10/1957 | Deddo | 156/219 |
| 2,945,693 | 7/1960 | Way | 156/304.2 X |
| 3,366,291 | 1/1968 | Boyer, Jr. | 264/324 X |
| 3,799,174 | 3/1974 | Howard . | |
| 4,080,416 | 3/1978 | Howard | 264/324 X |
| 4,129,672 | 12/1978 | Momura et al. | 156/219 X |
| 4,130,619 | 12/1978 | Held | 156/304.2 X |
| 4,160,685 | 7/1979 | Kuroda | 156/219 |
| 4,170,086 | 10/1979 | Hills | 446/372 |
| 4,199,390 | 4/1980 | Pollard | 156/219 X |
| 4,432,822 | 2/1984 | Adams et al. | 156/219 X |

FOREIGN PATENT DOCUMENTS 897963 11/1953 Fed. Rep. of Germany ...... 441/391

Primary Examiner—Mickey Yu
Attorney, Agent or Firm—Roy A. Ekstrand

[57] ABSTRACT

A first sheet (3A) of weft-knitted polyester capable of stretching in two perpendicular directions and a first lining (3B) of polyester fabric are attached to opposite sides of a first 12 mm thick sheet (3C) of foamed polyurethane/polyester by means of an acrylic adhesive to form a first laminate (3) which is heat and pressure molded to form a face portion (1) and an integral neck extension (8) having two ends (9 and 10). A second sheet (18A) of weft-knitted polyester fabric capable of stretching in two perpendicular directions and a second sheet (18B) of polyester fabric are attached to opposite sides of a second 12 mm thick sheet (18C) of foamed polyurethane/polyester by means of an acrylic resin adhesive to form a second laminate (18) which is heat and pressure molded to form a crown portion (11). The crown portion (11) is sewn to the face portion (1) and the integral neck extension (8) to form part of an outer casing. The two ends (9 and 10) of the neck extension (8) are sewn together to form a tubular neck portion (2) and complete the outer casing. The outer casing is then filled with stuffing (12). The first and second sheets (3A and 18A) of weft-knitted polyester are colored by a sublimation printing process.

26 Claims, 7 Drawing Sheets

U.S. Patent  Jan. 9, 1990  Sheet 6 of 7  4,892,501
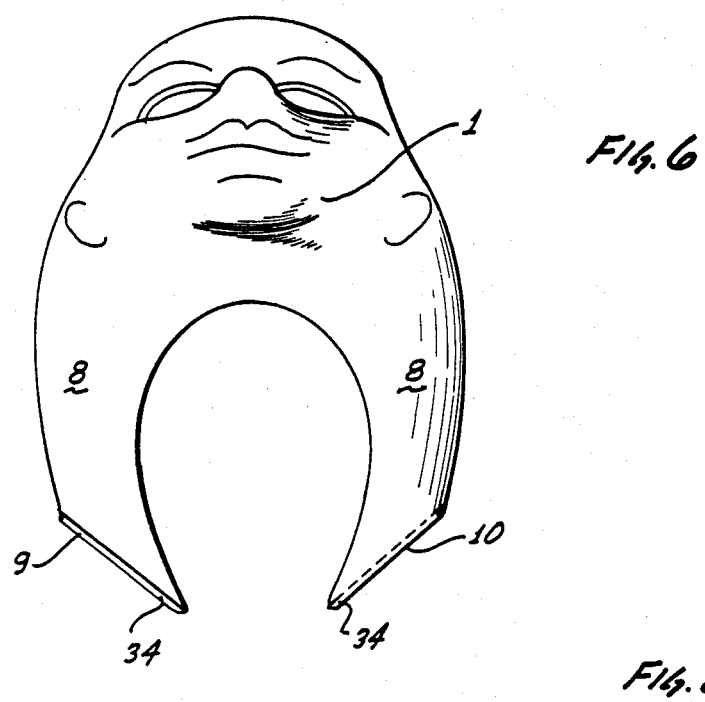
FIG. 6
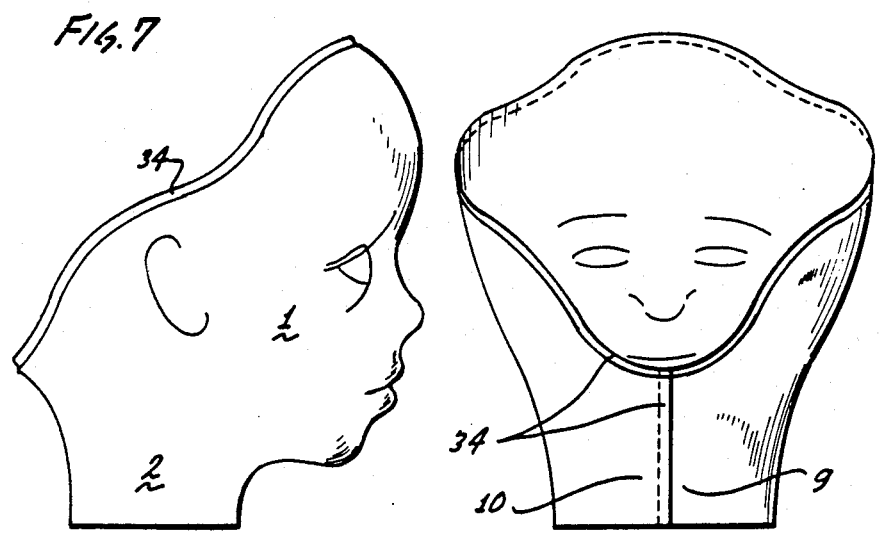
FIG. 7
FIG. 8

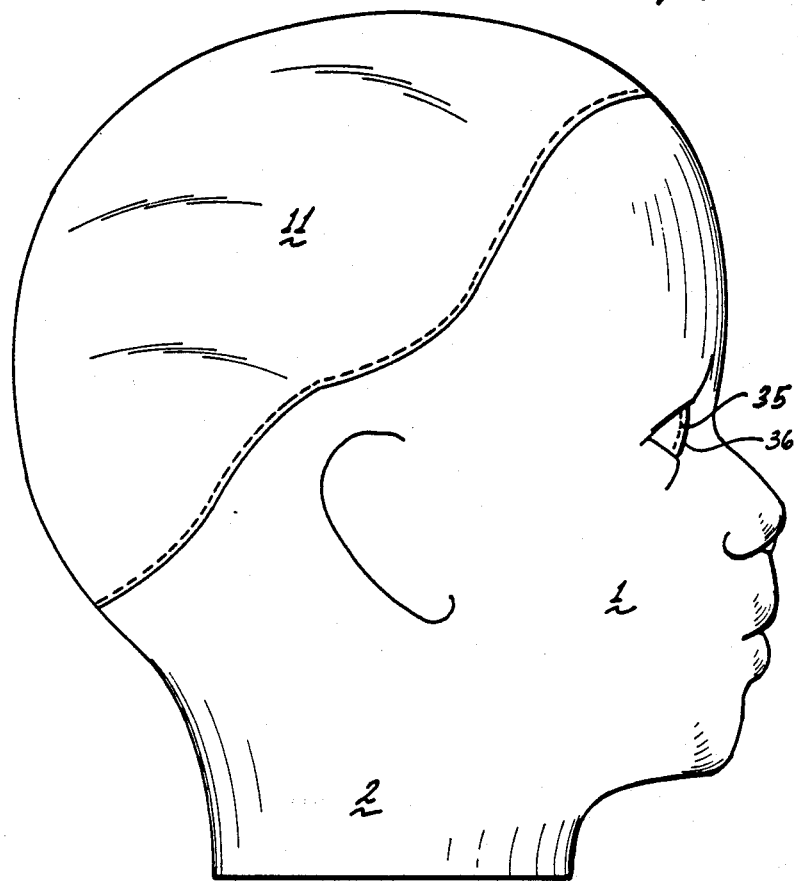

DOLL'S HEAD AND METHOD OF FABRICATION

This is a continuation of co-pending application Ser. No. 06/808,516 filed on 12/13/85 abandoned.

FIELD OF THE INVENTION

The invention relates to doll heads and, in particular, to a doll's head having a shaped or molded textile fabric surface and to a method of making such a doll's head.

BACKGROUND ART

Rag dolls are traditionally made from textile fabric sewn to form an outer casing which is filled with stuffing material. In this form of construction, the texture of the fabric and the softness of the stuffing are desirable attributes and acceptable definition for body parts such as hands and feet can be obtained by cutting and sewing the outer casing. However, it is difficult to make the head and face of such a doll on a mass production basis with sufficient definition to be life-like in appearance.

Some currently popular dolls overcome this difficulty in that the doll head is of molded plastic material such as polyvinyl chloride. However, the use of this form of plastic entails a number of disadvantages. In the first place, it is necessary to forego the pleasant texture and the soft feel of a stuffed textile fabric encased doll's head. The cost of manufacturing and fitting these plastic heads is also appreciable and, because these molded plastic heads are quite heavy, relatively complicated means must be provided for pivotally mounting the heads in the stuffed, textile fabric encased body portions of the dolls so as to prevent the head from pivoting under its own weight. Finally, in know manufacture of textile fabric or molded plastic heads of rag dolls, it is necessary to apply face markings after formation of the doll's head, normally by means of the application of several stencils and painting. This is a laborous and costly process.

In the research to improve upon soft bodied dolls, such as rag dolls, it was discovered that a process of shaping textile fabric material in the unrelated art concerned with the formation of women's brassiere cups could be adopted to make doll heads. In this brassiere making process, two sheets of two-way stretch fabric are attached or bonded to opposite sides of a sheet of foamed or expanded plastic material and these laminates are then formed into cup-shaped members of less than hemispherical extent by a pressing and heat-setting molding operation. However, this process was by itself incapable of forming cup-shaped members with sufficiently detailed portions to represent facial configuration features of a doll's head, such as eyes and nose, or with neck portions for attaching the doll's head to the remainder of the doll and the process did not form cup-shaped members which could be conveniently joined to form a substantially spherical doll's head with said neck portions. DISCLOSURE OF THE INVENTION The purpose of the present invention is to provide a method of forming a molded textile fabric surface which can be used to overcome the difficulties encountered in the formation of known doll's heads.

It is therefore an object of the invention to provide a method of forming a doll's head having a molded textile fabric surface with a texture which is soft and pleasant to the touch and, on the outside, an outer casing which is filled with stuffing so that the doll's head is soft and easily deformed. Such a head can possess all the detail of a molded plastic part and yet still be sewn to the remainder of a rag doll.

It is another object to provide a more economic way of producing a doll's head which is less costly to produce, less costly and more convenient to mark; and less costly and difficult to attach to a doll's body.

Finally, it is an object to provide a method of forming a doll's head having a molded textile fabric surface in which markings on the textile fabric forming the surface are applied to the fabric while the fabric is in its planar form, prior to molding.

The invention therefore provides a method of forming a doll's head, in which face and neck portions have molded textile fabric surfaces, comprising the steps of attaching a first sheet of textile fabric to one side of a first sheet cf foamed plastic to form a first laminate; pressing the first laminate between male and female dies of a first pressure mold with the textile fabric adjacent the female die, and heating at least one of the dies to form said face portion of a doll's head and an integral neck extension having two ends; forming a crown portion for the doll's head from pliable sheet material; attaching the crown portion to the face portion and to the integral neck extension, to form part of an outer casing; connecting the two ends of the neck extension to form said neck portion and complete said outer casing; and filling the outer casing with stuffing.

The invention also provides a doll's heat having face and neck portions with molded textile fabric surfaces, in which a first laminate comprises a first sheet of textile fabric adhesively attached to a sheet of foamed plastic; the first laminate is molded to form said face portion and an integral neck extension having two ends; a crown portion for the doll's head is formed of pliable sheet material; the crown portion is attached to the face portion and to the integral neck extension to form part of an outer casing; and the two ends of the neck extension are connected to form said neck portion and complete said outer casing; and the outer casing is filled with stuffing.

One method of construction of such a doll head involves the use of a first pressure mold in which the molding cavity formed in the female die is generally hemispherical in shape and in which the parting line between the male and female dies is inclined to the axis of relative movement between the male and female dies. With this form of construction, embossing cavities in the female die may be formed in the bottom portion of the molding cavity formed in the female die which bottom portion extends generally perpendicular to the axis of relative movement to thereby obtain maximum definition of facial configuration features on the doll's head.

In this case, the forehead component of the face portion is formed on one side of the bottom portion of the female die and the integral neck extension is formed the other side of the bottom portion of the female die in a portion of the female die in which the depth of the female die is greatest.

The embossing cavities and the corresponding projections in the male die may have a depth which is greater than the height of the corresponding protrusions on the face portion of the doll's head to allow for partial contraction of the laminate from its fully molded shape in the mold due to the inherent elasticity and resilience of the laminate.

Two doll's heads embodying the present invention and their method of manufacture are hereinafter described, by way of example, with reference to the accompanying drawings. BRIEF DESCRIPTION OF THE DRAWINGS FIG. 1 is a side elevation of a first, partially-completed doll's head constructed in accordance with the present invention and showing a crown portion attached to combined face and neck portions;

FIG. 6 shows a face portion and an integral neck strip obtained by trimming a first laminate which has been molded in the first pressure mold as shown in FIGS. 3 and 4;

Figure 1:
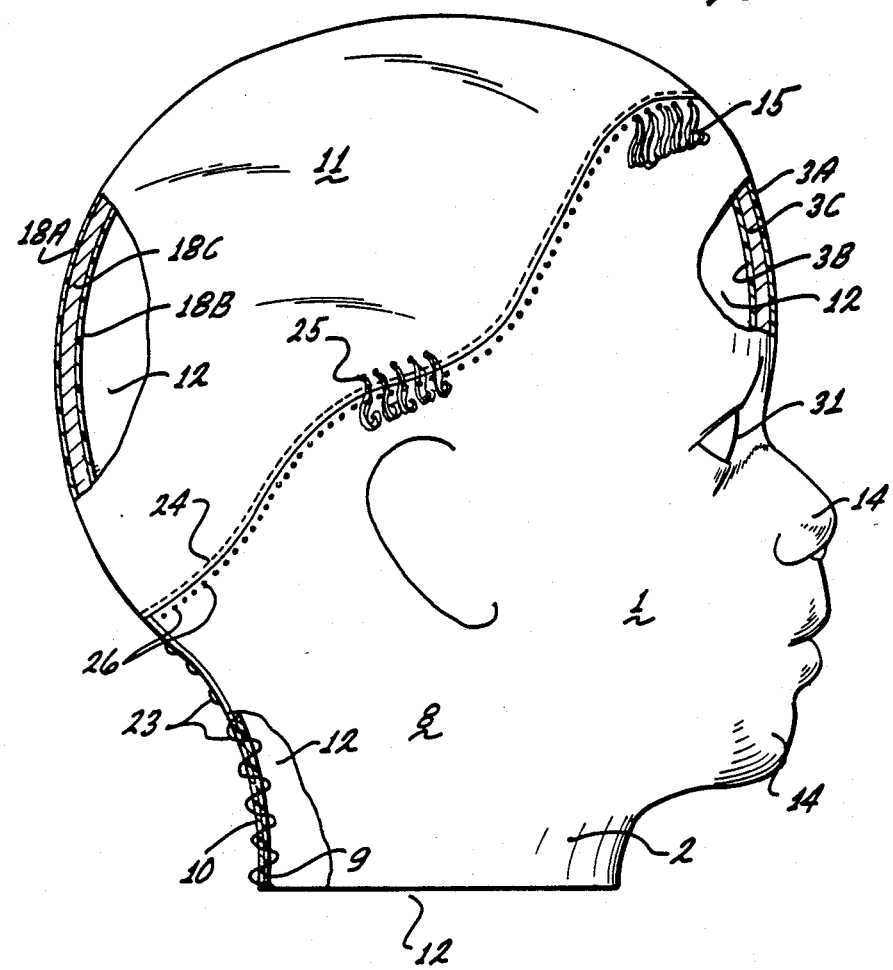
Figure 5:
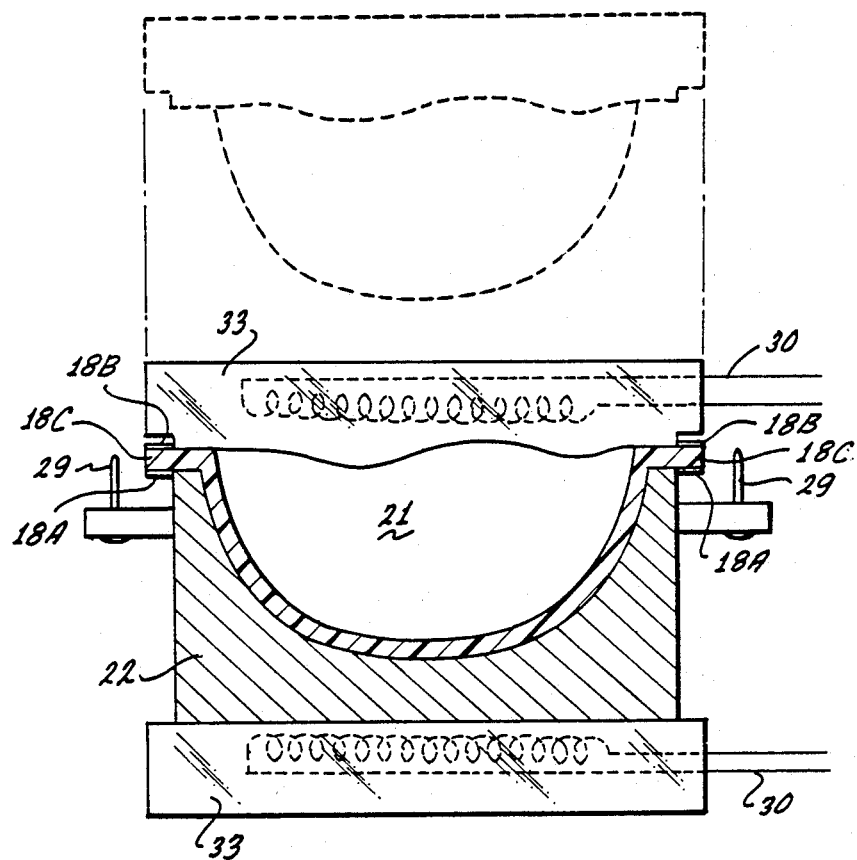
FIG. 5 is a schematic part-sectional side elevation of a second mold, illustrating the formation of a crown portion of the doll's head.

FIGS. 7 and 8 are side and rear elevations of combined face and neck portions obtained by joining the ends of the neck extension of the molded laminate shown in FIG. 5, prior to attachment of the crown portion; and FIG. 9 is a side elevation of a second partly-completed doll's head, in accordance with the invention, having a different eye construction. BEST MODES FOR CARRYING OUT THE INVENTION As shown in FIG. 1, a first head constructed in accordance with the present invention comprises two parts formed respectively from first and second 12mm thick laminates 3 and 18. The first laminate 3 comprises a first sheet 3A of weft-knitted polyester fabric and a first lining 3B of polyester Tricot mesh fabric are attached to opposite sides of a first sheet 3C of foamed polyurethane/polyester by means of an acrylic resin adhesive and is molded to form a face portion 1 having protrusions 14, such as the nose and chin protrusions shown in FIG. 1, and convex eye surfaces 31. The face portion 1 has an integral neck extension 8 with two ends 9 and 10 which are sewn together with a thread 23 by means of a cylinder bed toe stitching machine to form a tubular neck portion 2. The second laminate comprises a second sheet 18A and a second lining 18B, both of stretchable textile fabric, attached to opposite sides of a second sheet 18C of foamed plastic 18 and is heat and pressure moulded to form a crown portion 11 which is machine sewn to the face and neck portions 2 by means of a thread 24 to form an outer casing which is filled with polyester fiber stuffing 12.

The crown portion 11 is substantially hemispherical in shape and reinforces the remainder of the doll's head. As shown, the junction of the face and neck portions 1 and 2 with the crown portion 11 follows the hair line so that simulated hair 15 rooted in the crown portion 11 through apertures 25 cover up this junction. The junction is further obscured by rooting additional simulated hair 15 through apertures 26 in the upper edges of the face and neck portions 1 and 2.

Figure 2:
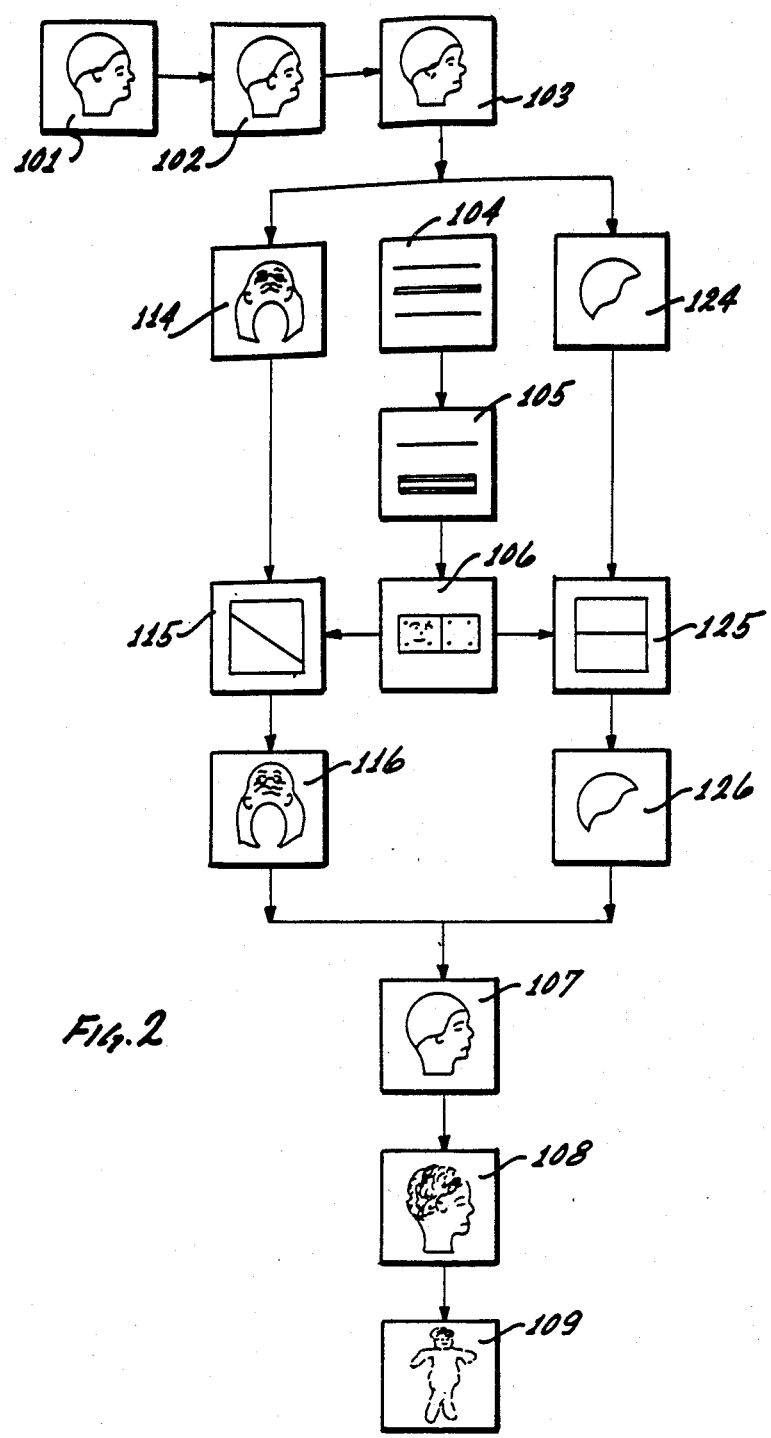
FIG. 2 is a flow diagram schematically illustrating the steps in the process of producing a doll having a doll's head as shown in FIG. 1.

As illustrated in FIG. 2, the first step 101 in the formation of a rag doll having a doll's head as shown in FIG. 1 is to sculpt a complete head in wax with all the parting lines for the required seams defined in the wax. For a 22 inch tall doll of about half life-size, the head is about 6 inches high, about 4 inches wide and about 5 inches deep from front to back.

Next, in step 102, a metal rotocast mold is made from the sculpted wax body. A hollow, polyvinyl chloride head is then formed in the rotocast mold and split into a first part comprising the face and neck portions and a second part comprising the crown portion, in step 103. These first and second parts of the rotocast PVC head are then used to form cast aluminium male and female dies of a first pressure mold in step 114, and aluminium male and female dies of a second pressure mold, in step 124.

In step 104, first and second sheets of two-way stretch polyester fabric and first and second linings of polyester tricot mesh fabric are attached to opposite sides of first and second 12mm thick sheets of polyurethane/polyester foam having a density of 30 Kg per cubic meter by means of an acrylic resin adhesive to form first and second laminates.

Skin tones and facial and registration markings are then applied to the first and second laminates by means of a four-color sublimation printing process in step 105. In this process, minute dots of sublimation ink are transferred from transfer papers which are held against the first and second sheets forming parts of the first and second laminates.

In step 106, a first laminate is fed to the first mold and a second laminate is fed to the second mold.

Figure 3:
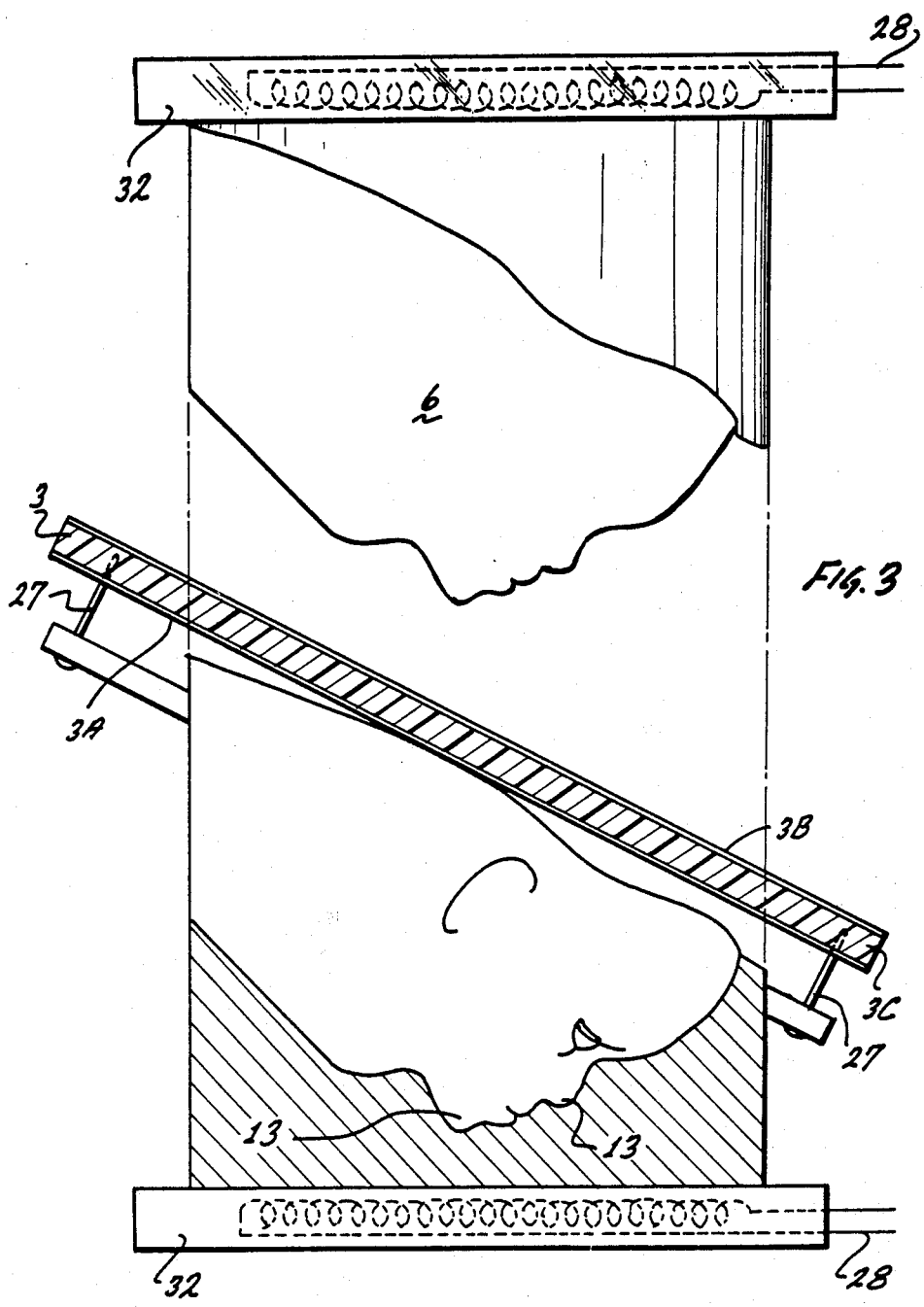
FIGS. 3 and 4 are schematic part-sectional side elevations of a first pressure mold and a first laminate with the male and female dies of the first mold shown in open and closed configuration.
Figure 4:
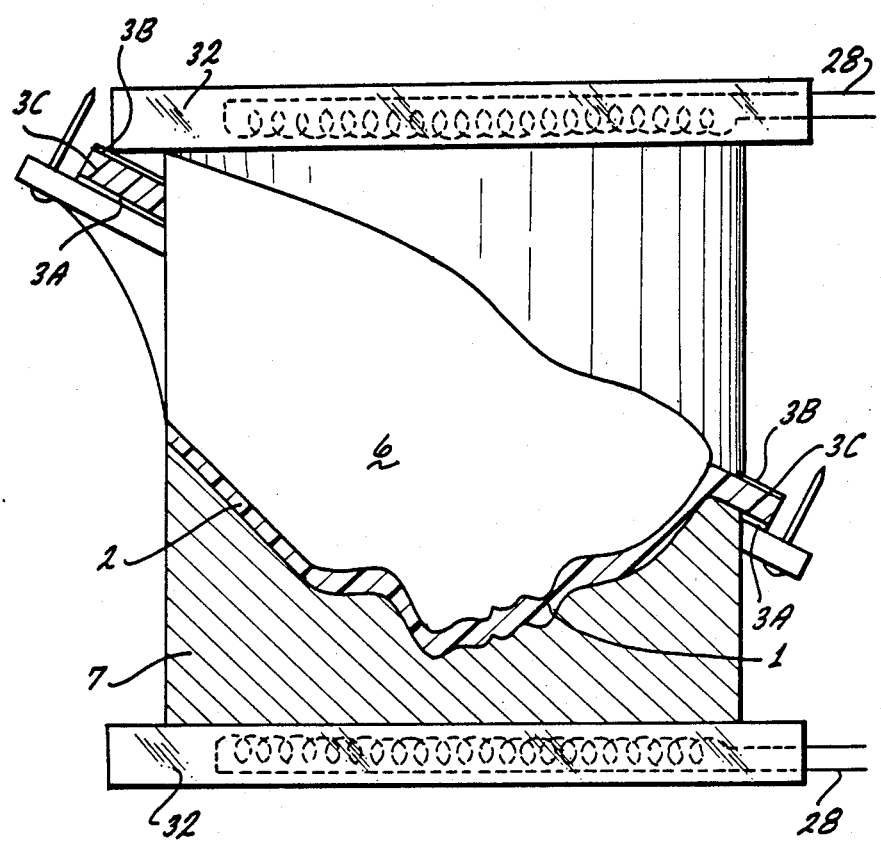

As described more fully with reference to FIGS. 3 and 4, the first laminate is then formed into a first part of the required doll's head in step 116 and, as described more fully with reference to FIG. 4, the second laminate is formed into a second part of the required doll's head on step 126.

In step 116, the first laminate is then removed from the first mold and trimmed to form the first part of the doll's head comprising the face and neck portions, as shown in FIG. 6. Similarly, in step 126, the second laminate is removed from the second mold and trimmed to form the second part of the doll's head comprising the crown portion.

In step 107, the first part of the doll's head is folded as shown in FIGS. 7 and 8 and the second part of the doll's head, comprising the crown portion is sewn to the face and neck portions constituting the first part by means of a cylinder bed toe stitch sewing machine. This machine is then used to sew the two ends of the neck extension together to form a hollow outer casing.

Simulated hair is then rooted in the marginal edges of the face and neck portions 1 and 2 and in the crown portion, and the outer casing is filled with polyester fiber in step 108.

Finally, in step 109, the doll's head is sewn on to the torso of a rag doll by means of a cylinder head toe stitch sewing machine.

As shown in FIG. 3, a piece of first laminate 3 incorporating a first sheet 3A, bearing skin tones, facial markings and registration markings is placed between the male and female dies 6 and 7 of a first pressure mold with the first sheet 3A adjacent the female die and held in place by registration pins 27 (only two of which are shown) with which the registration markings have been aligned which penetrate part way through the laminate 3. Prior to molding, when the laminate 3 is gripped between the male and female dies 6 and 7, the laminate 3 is released from the pins 27 so as to allow the laminate to be drawn into the mold. As shown in FIG. 3, the parting line between the male and female dies 6 and 7 is inclined to the axis of relative movement between the male and female dies 6 and 7 and the bottom portion of the female die 7 which extends generally perpendicular to the axis of relative movement between the male and female dies 6 and 7 is shaped so as to form the detailed facial configuration features of the face portion 1. As shown, this bottom portion of the female die is formed with embossing cavities 13 and these cavities 13 (and the corresponding protrusions on the male die 6) have depths which are greater than the heights of the corresponding protrusions 14 on the face portion 1. As a result, the male die 6 presses the first laminate 3 into the female die 7. The foamed polyurethane/polyester is also compressed between the male and female dies 6 and 7 so as to reduce the thickness of the first laminate 3 from 12mm to 3mm and, at the same time, the first sheet 3A of weft-knitted polyester fabric and the first lining 3B of polyester Tricot mesh fabric stretch in order to accommodate this shaping of the first laminate 3. This shaping and compression of the first laminate 3 is made permanent by heating the male and female dies 6 and 7 to 195° C. for 90 to 100 seconds by means of heating means 28 shown, schematically, in FIGS. 3 and 4 as an electrical heating elements embedded in supports 32 for the male and female dies 6 and 7.

The second laminate 18 is formed, for convenience, from the same materials as the first laminate 3 and comprises a second sheet 18A of weft-knitted polyester fabric and a second polyester Tricot mesh fabric lining 18B attached to opposite sides of a second sheet 18C of polyurethane/polyester by means of acrylic resin adhesive and a piece of the second laminate 18 is formed into a crown portion 11 in a second pressure mold having male and female dies 21 and 22, as shown in FIG. 5.

A marked piece of second laminate 18 is positioned between the male and female dies 21 and 22 of the second pressure mold on registration pins 29 (only two of which are shown) with the second sheet 18A adjacent the female die 22 and attached to the female mold 22. The male die is then moved from its open position, shown in dotted outline, and presses the second laminate 18 into the female mold 22 and compresses it from a thickness of 12mm to a thickness of 3mm to form a crown portion 11 from the second laminate 18 as shown. The male and female dies 21 and 22 are then heated by heating means 30 shown, schematically, in FIG. 3 as electric heating elements embedded in supports 33 for the male and female dies 21 and 22 so that the second laminate is raised in temperature to 195° C. for 90 to 100 seconds so as to ensure that the crown portion 11 will retain its shape and compressed state.

The male and female dies 6 and 7 of the first mold and the male and female dies 21 and 22 of the second mold are shaped to form the mating edges of the face, neck and crown portions 1, 2 and 11 with lap joints 34 which fit flush when these edges are sewn together.

The molded first laminate 3 is removed from the first pressure mold and the unwanted edges are removed by trimming to provide a face portion 1 with an integral neck strip 8, as shown in FIG. 6. A crown portion 11, obtained by trimming the unwanted edges from the molded second laminate 18 removed from the second pressure mold, is then machine sewn with a thread 24 to the upper edges of the face and neck portions 1 and 2. The ends 9 and 10 of the neck strip 8 are then machine sewn together by means of thread 23 to form a tubular neck portion 2 integral with the face portion 1 to complete the outer casing shown in FIG. 1. Simulated hair 15 is then attached to the marginal edges of the face and neck portions 1 and 2 and to the crown portion 11, as described with reference to FIG. 1 and the outer casing is filled with resilient polyester fibre stuffing 12.

The provision of first and second linings 3B and 18B facilitates the sewing of seams with threads 23 and 24 respectively between the ends 9 and 10 of the neck extension 8 and between the first part comprising the face and neck portions and the second part comprising the crown portion.

In the embodiment described with reference to FIGS. 1 to 7, convex surfaces 31 are provided to represent eyes on the doll's head and coloring for the eyes is effected in the four-color sublimation printing process to which the first sheet of weft-knitted polyester fabric is subjected, prior to being incorporated into the first laminate 3.

In an alternative construction illustrated in FIG. 9, eye recesses 35 are formed in the face portion 1 and plastic eye pieces 36 are inserted in these recesses 35. The plastic eye pieces 36 can be provided with some or all of the coloring required for the eyes and, except for the case where all the coloring for the eyes is provided by these plastic eye pieces 36, at least part of the eye coloring is provided in the sublimation printing process to which the sheet 3 of weft-knitted polyester fabric is initially subjected.

The first sheet 3A of textile fabric is preferably of a weft-knitted 100% spun polyester capable of stretching between 25% and 40% in two perpendicular directions. Textile fabric such as this is capable of withstanding the high temperature of the forming process and capable of stretching sufficiently to provide the definition required for the facial configuration features on the doll's head. In a preferred embodiment of the invention, the polyester fabric weighs 258 gm per square meter, comprises 48 Fil, 1.3 Denier per Filament, 42 Count yarn and is heat set for sublimation transfer printing at approximately 200° C. However, similar synthetic two-way stretch fabric which is capable of heat setting at about 200–250° C. can also be used.

The foamed plastic sheet 3C is preferably expanded polyurethane/polyester having a density of 30 Kg per cubic meter. The chemical content of this material is as follows:

| | |
|---|---|
| 1. Nias Polyol 16-56 approximately | 97% |
| 2. Toluene Di-Isocyanate 80-20 | 1% of (1) |
| 3. Silicone Surfactant | 1.5% of (1) |
| 4. Amine Catalyst | 0.1% of (1) |
| 5. Freon | 0.1% of (1) |
| 6. Stannous Octoate | 0.15% of (1) |

Freon 11 is a material sold by E.I. Du Pont de Nemours and Company, which material is trichloro fluoro methane. Freon is a trademark of E.I. Du Pont de Nemours and Company used for its fluorocarbon solvents.

This material has been found to mold satisfactorily when a 12mm thick first laminate 3 is pressurised and heated to 195° C. for 90 to 100 seconds to form a 3mm thick molded laminate. This gives adequate rigidity for support while retaining softness to the touch.

Heat setting may be effected at temperatures ranging from 180° C. to 230° C. for periods of from 60 to 120 seconds.

The crown portion 11 of the doll's head may also be formed of foamed plastic and, in practice, it is convenient to form the crown portion from a second laminate 18 similar to the first laminate 3. Moreover, as it is convenient to attach the crown portion 11 to the face and neck portions 1 and 2 by sewing, it is desirable to provide linings 3B and 18B of textile fabric on the inside of the face portion 1 and the integral neck extension 8 and on the inside of the crown portion 11. This provides a better anchorage for the stitching. These linings 3B and 18B are preferably of polyester textile fabric and, in practice, two-way stretch Tricot mesh is quite satisfactory although other similar two-way stretch heat-setting synthetic fabric materials such as nylon mesh can also be used. It is therefore convenient to form the face and neck portions 1 and 2 from a first laminate 3 which is identical with the second laminate 18 from which the crown portion 11 is formed in that both first and second laminate 3 and 18 comprise a sheet of two-way stretch weft-knitted polyester stretch fabric on one side and a lining of two-way stretch 100% polyester tricot mesh fabric on the other side. The three layers of these laminates 3 and 18 are attached to each other by means of acrylic resin adhesive.

Foamed plastic sheets 3C and 18C of the different density and thickness may also be used and successful results have been achieved with sheets from 5mm to 13mm thick. The initial thickness depends, of course on the original density of the foamed plastic and the degree of compression to which it is subjected during the molding process. The primary criterion is that the compressed laminate in the formed doll's head should be sufficiently rigid to retain its shape and yet sufficiently soft to the touch to simulate a living person's head.

The first and second sheets 3A and 18A of textile fabric providing the "skin" for the doll's head is preferably 0.3mm thick, but sheets having thickness of 0.1mm to 0.5mm provide a suitably skin-like feed and texture.

Similarly, the first and second linings 3B and 18B of the first and second laminates 3 and 18 should preferably have a thickness of at least 0.1mm to provide an anchorage for stitching used to connect parts of the doll's head, but thicknesses of up to 0.2mm are acceptable.

In practice, both the outer sheet and inner lining of each laminate 3 and 18 become embedded in the foamed plastic during the shaping and compressing process.

Formation of the doll's head in two connectable parts has three main advantages. In the first place, by forming the head in two parts, one part can be formed with the required definition to reproduce the required facial configuration features and with two edges which have to be joined. Secondly, the crown portion can be relatively deep drawn to provide a substantially hemispherical portion which, when attached to the first part, provides rigidity and strength. Finally, it is possible to form the two parts of the doll's head so that the joints between these two parts lie just inside the hair line provided on the doll's head. That is to say, simulated hair may be attached to the crown portion and to marginal edges of the face and neck portions so as to hide the joint between the two parts of the doll's head. Finally, the two edges of the first part which have to be joined after attachment of the crown portion are opposite ends of the neck portion and so can be joined as a single seam at the back of the neck portion which can be easily hidden.

The marking of facial features on the doll's head can be effected, after formation of the head, by known stencilling techniques. However, this is a relatively costly and time consuming process and the two-part form of construction hereinbefore described lends itself to the coloring of the face and neck portions of the doll's head by a process in which the coloring of facial features and/or skin tones can be applied to the first sheet of textile fabric of each first laminate prior to the shaping of this laminate in the first pressure mold because of the precise molding effected in this mold. The crown portion can also be colored in our analagous manner. This provides a much superior appearance to that obtained by known marking techniques such as the use of stencilling.

In a preferred embodiment, the first sheet of the first laminate is colored by a sublimation printing process after being adhesively attached to the first sheet of foamed plastic. Realistic skin tones and feature colouring can be obtained by means of a four-color sublimation printing process.

In this process, the required coloring on the face and neck portions of the doll's head are applied to a transfer paper in the form of minute dots of red, yellow, blue and black sublimation ink which are varied in their proportions to reproduce a wide variety of colors. The transfer paper is held against the first sheet of textile fabric and heated. As a result, the sublimation ink is transformed into a gaseous medium, in a sublimation process, and diffuses into the first sheet of textile fabric to provide a permanent coloring without changing the surface feel or appearance of the textile fabric. Clearly, the marking applied to the first sheet of textile fabric will differ from that required on the shaped face and neck portions of the doll's head to take account of the stretching and distortion of said first sheet during the molding of these face and neck portions.

To obtain distorted artwork to be applied to the first sheet of textile fabric forming part of the first laminate, a grid is marked on a blank first sheet and the laminate bearing this grid marking is shaped in the first pressure mold. It is then possible to see where the facial configuration features lie in relation to the grid and so the coloring associated with these features can be applied to another flat sheet in positions corresponding to the appropriate grid intersections on the shaped laminate. Transfer paper for the sublimation process can then be printed with sublimation ink to reproduce this distorted work.

In summary, the invention provides a way of utilizing the diverse techniques of brassiere cup formation, pressure mold construction, heat-set molding and sublimation printing of textile fabric in a novel and effective method of forming a completely new form of doll's head which has the shape and definition of a molded plastic doll's head, the softness and surface texture of a rag doll, and realistic coloring.

The outer casing of the doll's head is formed of two parts which are shaped so that, when joined, connecting edges are easily concealed. The first part, incorporating the face and neck portions, is shaped so as to be capable of formation in a specially shaped pressure mold which converts a flat laminate into a roughly hemispherical shape in which facial configuration features are clearly defined in a portion of the hemispherically shaped laminate which is offset from the center of this hemispherical shape. The hemispherical shape is such that after trimming and folding, the first part of the outer casing mates with a substantially hemispherically-shaped second part of the outer casing, comprising the crown portion of the doll's head, so that the intersection of these parts follows the hair line on the doll's head and so that the substantially hemispherically-shaped second part rigidifies the whole outer casing.

Both first and second parts are formed by compressing, molding and heat setting laminates in which textile fabric is attached to opposite sides of a sheet of foamed plastic. This provides shaped laminates which are sufficiently rigid to retain their shape when incorporated into the finished doll's head and yet soft and yielding like the body portion of a rag doll.

This laminate construction lends itself to the coloring and marking of the doll's head by a sublimation printing process in that suitably distorted artwork printed in sublimation ink on transfer paper can be transferred from this paper on to the textile fabric on one side of the laminate before this laminate is compressed, molded and heat set so as to provide superior coloring and marking of the compressed, molded and heat set laminate.

I claim:

1. A method of forming a doll's head, in which face and neck portions (1 and 2) have molded textile fabric surfaces;

Comprising the steps of
   adhesively attaching a first sheet (3A) of textile fabric to one side of a first sheet (3C) of foamed plastic to form a first laminate (3);
   pressing the first laminate (3) between male and female dies (6 and 7) of a first pressure mold with the first textile fabric sheet (3A) adjacent to the female die (7) and heating at least one of the dies (6 and 7) to form said face portion (1) of a doll's head and an integral neck extension (8) having two ends (9 and 10);
   forming a crown portion (11) for the doll's head from pliable sheet material;
   attaching the crown portion (11) to the face portion (1) and to the integral neck extension (8) to form part of an outer casing;
   connecting the two ends (9 and 10) of the neck extension (8) to form said neck portion (2) and complete said outer casing; and
   filling the outer casing with stuffing (12).

2. A method, according to claim 1, in which the first laminate (1) is raised in temperature to 195° C. for a period of 90 to 100 seconds while being pressed by the first pressure mold.

3. A method, according to claim 1, in which facial configuration features on the doll's head are formed by suitably shaping bottom portions of the male and female dies (6 and 7) which extend generally perpendicular to the axis of relative movement between the male and female dies (6 and 7).

4. A method, according to claim 3, in which said bottom portion of the female die (7) is formed with embossing cavities (13) having a depth which is greater than the height of corresponding protrusions (14) on the face portion (1) of the doll's head.

5. A method, according to claim 1, in which the textile fabric is a weft-knitted 100% spun polyester fabric capable of stretching between 25% and 40% in two perpendicular directions.

6. A method, according to claim 5, in which the textile fabric weighs 258 gm per square meter and comprises 48 Fil, 1.3 denier per filament, 48 count yarn which has been heat set for treatment at 200° C. to 250° C.

7. A method, according to claim 1, in which the foamed plastic is polyurethane/polyester having a density of 30 Kg per cubic meter and the first sheet of foamed plastic is 12 mm thick.

8. A method, according to claim 1, in which:
   the textile fabric is a weft-knitted 100% spun polyester fabric capable of stretching between 25% and 40% in two perpendicular directions;
   the foamed plastic is polyurethane/polyester, having a density of 30 Kg per cubic meter; and
   the textile fabric and the foamed plastic are attached to each other by means of acrylic resin adhesive.

9. A method, according to claim 1, in which simulated hair (15) is attached to the crown portion (11) and to marginal edges (16 and 17) of the face and neck portions (1 and 2).

10. A method, according to claim 1, in which the first sheet 3A of textile fabric of the first laminate (3) is colored by a sublimation printing process after being attached to the first sheet 3C of foamed plastic.

11. A method, according to claim 9, in which the crown portion (11) is formed by adhesively attaching a second sheet (18A) of textile fabric to one side of a second sheet (18C) of foamed plastic to form a second laminate (18), by pressing the second laminate (18) between male and female dies (21 and 22) of a second pressure mold with the second textile fabric sheet (18) adjacent the female die (22), and by heating at least one of the dies (21 and 22).

12. A method, according to claim 11, in which first and second linings (3B and 18B) of textile fabric are respectively attached to the other sides of the first and second sheets (3C and 18C) of foamed plastic before the first and second laminates (3 and 18) are pressed between the male and female dies of the first and second pressure molds.

13. A method, according to claim 12, in which the textile fabric of the first and second linings (3B and 18B) is a two-way stretch 100% polyestr -Tricot mesh fabric.

14. A method, according to claim 12, in which the first and second sheets (3A and 18A) of textile fabric of the first and second laminates (3 and 18) are colored by a sublimation printing process before being attached to the first and second sheets (3C and 18C) of foamed plastic.

15. A method, according to claim 1, in which eye pieces (36) are fitted to the face portion (1).

16. A doll's head comprising:
    a face and neck portion including a first integral piece of thin, heat set, compressed laminated material of relatively uniform thickness capable of retaining a predetermined shaped configuration simulating a face and neck, said first piece of thin laminated material including (a) a first exterior layer of textile fabric of relatively uniform thickness, (b) a first interior layer of textile fabric of relatively uniform thickness, and (c) a first middle layer of heat set, compressed foamed plastic of relatively uniform thickness between said first interior and exterior layers, and first interior and exterior layers being attached to said first middle layer by an adhesive, said first piece of thin laminated material being soft and resilient;
    a crown portion including a second integral piece of thin, heat set, compressed laminated material of relatively uniform thickness capable of retaining a predetermined shaped configuration simulating a generally convex-shaped top portion of a head, second piece of laminated material including (a) a second exterior layer of textile fabric of relatively uniform thickness, (b) a second interior layer of textile fabric of relatively uniform thickness, and (c) a second middle layer of heat set, compressed foamed plastic of relatively uniform thickness between said second interior and exterior layers, said second interior and exterior layers being attached to said second middle layer by an adhesive, said second piece of thin lamentated material being soft and resilient, said crown portion being attached to said face and neck portion to form a hollow outer casing which is shape-retaining, soft and resilient; and stuffing material filling said hollow outer casing.

17. The doll's head of claim 16 wherein said face and neck portion and said crown portion are sewn together along a common joint, said face and neck portion having two integral neck strips that are sewn together forming a partial cylinder.

18. The doll's head of claim 17 wherein said face and neck portion and said crown portion are joined together using lap joints.

19. The doll's head of claim 18 wherein said first and second interior and exterior layers are relatively thin in comparison to said first and second middle layers, said first and second pieces of laminated material are about 3 mm thick, said first and second interior and exterior layers are attached to said first and second middle layers by acrylic resin adhesive and said foamed plastic is polyurethane polyester.

20. The doll's head of claim 19 wherein said first and second exterior layers of textile fabric are two-way stretch weftknitted polyester stretch fabric, said first and second interior layers of textile fabric are two-way stretch 100% polyester tricot mesh fabric, and said first and second layers of foamed plastic are polyurethane polyester.

21. The doll's head of claim 19 wherein said first and second exterior layers are weft-knitted 100% spun polyester fabric capable of stretching between 25% and 40% in two perpendicular directions.

22. The doll's head of claim 21 wherein said polyester fabric weighs in the range of about 25 to about 258 gm per square meter and comprises 48 Fil, 1.3 denier per filament, in the range of about 42 to about 48 count yarn which has been heat set for treatment at 200° C. to 250° C.

23. The doll's head of claim 16 wherein said first and second exterior layers are weft-knitted 100% spun polyester fabric capable of stretching between 25% and 40% in two perpendicular directions, said first and second interior layers are two way stretch 100% polyester tricot mesh fabric, said foamed plastic is polyurethane polyester having a density in the range of about 30 to about 120 kg per cubic meter, and said first and second interior and exterior layers and said foamed plastic are attached to each other by means of acrylic resin adhesive.

24. The doll's head of claim 17 further comprising eye pieces fitted to said face and neck portion and simulated hair attached to said crown portion and adjacent said common joint where said crown portion and said face and neck portion are sewn together.

25. The doll's head of claim 16 wherein said first exterior layer is colored by a sublimation printing process.

26. A doll's head comprising:

a face and neck portion including an intergral piece of thin, heat set, compressed laminated material of relatively uniform thickness capable of retaining a predetermined shaped configuration simulating a face and neck, said piece of thin laminated material including (a) an exterior layer of textile fabric of relatively uniform thickness, (b) an interior layer of textile fabric of relatively uniform thickness, and (c) a middle layer of heat set, compressed foamed plastic of relatively uniform thickness located between and attached by an adhesive to said interior and exterior layers, said integral piece of laminated material including two integral neck strips attached together forming a partial cylinder, said interior and exterior layers being relatively thin in comparison to said middle layer providing a relatively soft and resilient face and neck portion;

a crown portion of thin pliable material of relatively uniform thickness simulating a generally convex-shaped top portion of a head, said crown portion being attached to said face and neck portion in order to form a hollow outer casing which is shape-retaining, soft and resilient; and stuffing material filling said hollow outer casing.

* * * * *